H. J. DEAL.
Microscope for Examining Flour and Bolting Cloths.

No. 214,283.        Patented April 15, 1879.

Attest:
C. Clarence Poole
W. H. Morsell.

Inventor:
H. J. Deal
per atty A. H. Evans & Co.

UNITED STATES PATENT OFFICE.

HENRY J. DEAL, OF BUCYRUS, OHIO.

IMPROVEMENT IN MICROSCOPES FOR EXAMINING FLOUR AND BOLTING-CLOTHS.

Specification forming part of Letters Patent No. 214,283, dated April 15, 1879; application filed March 1, 1879.

*To all whom it may concern:*

Be it known that I, HENRY J. DEAL, of Bucyrus, Ohio, have invented a new and useful Flour and Bolting-Cloth Examiner, of which the following is a clear, full, and exact description, reference being had to the accompanying drawings, making a part of this specification, in which—

Figure 1:
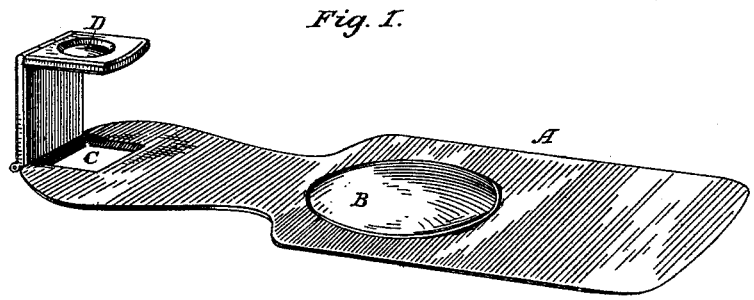
Figure 2:
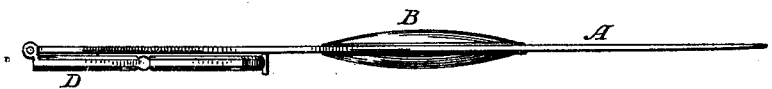

Figure 1 is a perspective view of my new device. Fig. 2 is a side view of the same.

To enable others skilled in the art to make and use my invention, I will proceed to describe the exact manner in which I have carried it out.

My invention relates to that class of devices used for the close inspection of flour, to determine its quality and purity, and to determine the fineness of the bolting-cloth through which it has passed; and it consists, first, in a flat spatula or plate of any suitable material, preference being given to nickel-plated metal, in the body of which is inserted a magnifying-glass; and, secondly, in the fixed opening of any given size, with a magnifying-glass conveniently arranged for seeing the threads of the bolting-cloth through opening.

In the drawings, A represents a spatula or plate for separating, pressing, and smoothing the flour to be inspected. After the flour has been properly smoothed, the magnifying-glass B, secured in the body of the plate, is brought over the surface of the flour, when the eye can readily and accurately determine the quality and purity of flour thus inspected.

Through the upper end of the handle of the plate I make the opening C, preferably made one-quarter of an inch square, through which to see and count the threads of the bolting-cloth, and thus determine its fineness. Immediately over the opening C, I secure the hinged magnifying-glass D, arranged to secure the proper focus for examining the bolting-cloth through the opening, and determining accurately the number of threads to the square inch.

I am aware that polished transparent glass has been used for making a spatula or plate for testing meal and flour, but such is not my invention.

Having thus described my invention, what I claim as new, and desire to secure by Letters Patent, is—

1. A flour and bolting-cloth examiner consisting of the spatula or plate A, in combination with the magnifying-glass B, substantially as set forth.

2. A flour and bolting-cloth examiner consisting of the spatula or plate A, provided with the opening C and magnifying-glass B, in combination with the hinged magnifying-glass D, substantially as and for the purpose set forth.

HENRY J. DEAL.

Witnesses:
W. B. RICHIE,
JOHN A. EATON.